United States Patent [19]

McIntosh

[11] 3,914,586

[45] Oct. 21, 1975

[54] DATA COMPRESSION METHOD AND APPARATUS

[75] Inventor: Duane E. McIntosh, Santa Ynez, Calif.

[73] Assignee: General Motors Corporation, Detroit, Mich.

[22] Filed: Oct. 25, 1973

[21] Appl. No.: 409,607

[52] U.S. Cl. ............................... 235/154; 340/172.5
[51] Int. Cl.² ............................................ G06F 5/00
[58] Field of Search ................... 340/172.5; 235/154

[56] References Cited

UNITED STATES PATENTS

| | | | |
|---|---|---|---|
| 3,310,786 | 3/1967 | Rinaldi | 340/172.5 |
| 3,413,611 | 11/1968 | Pfuetze | 340/172.5 |
| 3,490,690 | 1/1970 | Apple | 235/154 |
| 3,571,807 | 3/1971 | Candy | 340/172.5 |
| 3,612,660 | 10/1971 | Miller | 340/172.5 |
| 3,633,172 | 1/1972 | Eggimann | 340/172.5 |
| 3,689,899 | 9/1972 | Franaszek | 340/172.5 |
| 3,701,111 | 10/1972 | Cocke | 340/172.5 |
| 3,701,893 | 10/1972 | Shimaya | 235/154 |

*Primary Examiner*—Gareth D. Shaw
*Assistant Examiner*—James D. Thomas
*Attorney, Agent, or Firm*—Albert F. Duke

[57] ABSTRACT

Data compression apparatus is disclosed which is operable in either a bit pair coding mode or a word coding mode depending on the degree of redundancy of the data to be encoded. Consecutive words of data to be encoded are compared and if the words are not identical within a predefined tolerance the data is encoded on a bit pair basis. The bit pair encoding produces transitions in the coded output signals at the beginning of the first of two bit cells which contain a discrete pair of 1's and at the middle of the first of two bit cells which contain a discrete pair of 0's. If the data to be encoded contains a sufficient number of consecutive identical words to permit a greater data compression on a word basis rather than a bit pair basis the first word in the consecutive identical words is encoded on a bit pair basis to identify the bit pattern and a unique transitional pattern incapable of being generated during bit pair coding is generated to identify the number of succeeding words which are identical with the first word.

8 Claims, 9 Drawing Figures

| COMPARE GROUP SIZE / WORD SIZE | IN WORD SIZE MULTIPLIES | | | | | | | | | |
|---|---|---|---|---|---|---|---|---|---|---|
| | 1 | 2 | 3 | 4 | 5 | 6 | 7 | 8 | 9 | 10 OR > |
| 1 | 10 | 5 | 4 | 3 | 2 | 2 | 2 | 2 | 2 | 1 |
| 2 | 5 | 3 | 2 | 2 | 1 | 1 | 1 | 1 | 1 | 1 |
| 3 | 4 | 2 | 2 | 1 | 1 | 1 | 1 | 1 | 1 | 1 |
| 4 | 3 | 2 | 1 | 1 | 1 | 1 | 1 | 1 | 1 | 1 |
| 5 | 2 | 1 | 1 | 1 | 1 | 1 | 1 | 1 | 1 | 1 |
| 6 | 2 | 1 | 1 | 1 | 1 | 1 | 1 | 1 | 1 | 1 |
| 7 | 2 | 1 | 1 | 1 | 1 | 1 | 1 | 1 | 1 | 1 |
| 8 | 2 | 1 | 1 | 1 | 1 | 1 | 1 | 1 | 1 | 1 |
| 9 | 2 | 1 | 1 | 1 | 1 | 1 | 1 | 1 | 1 | 1 |
| 10 OR > | 1 | 1 | 1 | 1 | 1 | 1 | 1 | 1 | 1 | 1 |

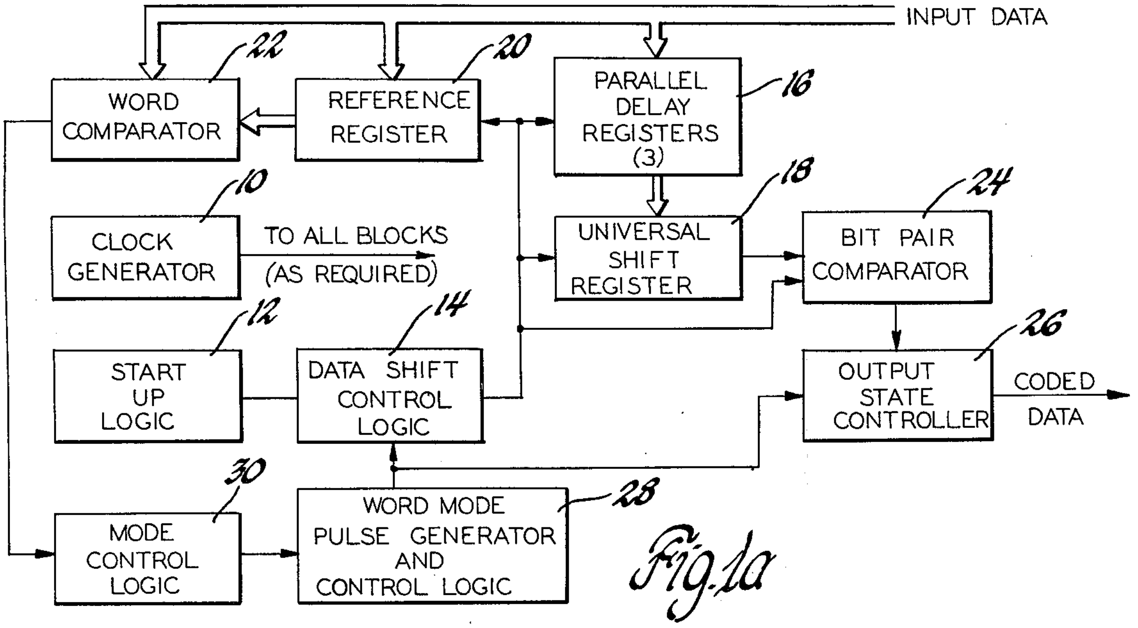
Fig.1a
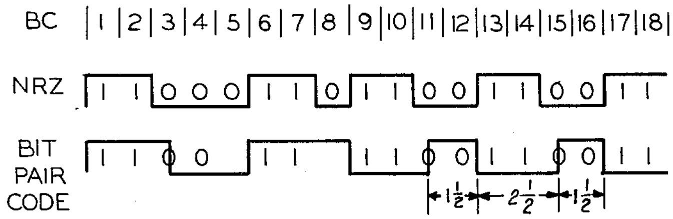
Fig.1b
| COMPARE GROUP SIZE / WORD SIZE | IN WORD SIZE MULTIPLIES | | | | | | | | | |
|---|---|---|---|---|---|---|---|---|---|---|
| | 1 | 2 | 3 | 4 | 5 | 6 | 7 | 8 | 9 | 10 OR > |
| 1 | 10 | 5 | 4 | 3 | 2 | 2 | 2 | 2 | 2 | 1 |
| 2 | 5 | 3 | 2 | 2 | 1 | 1 | 1 | 1 | 1 | 1 |
| 3 | 4 | 2 | 2 | 1 | 1 | 1 | 1 | 1 | 1 | 1 |
| 4 | 3 | 2 | 1 | 1 | 1 | 1 | 1 | 1 | 1 | 1 |
| 5 | 2 | 1 | 1 | 1 | 1 | 1 | 1 | 1 | 1 | 1 |
| 6 | 2 | 1 | 1 | 1 | 1 | 1 | 1 | 1 | 1 | 1 |
| 7 | 2 | 1 | 1 | 1 | 1 | 1 | 1 | 1 | 1 | 1 |
| 8 | 2 | 1 | 1 | 1 | 1 | 1 | 1 | 1 | 1 | 1 |
| 9 | 2 | 1 | 1 | 1 | 1 | 1 | 1 | 1 | 1 | 1 |
| 10 OR > | 1 | 1 | 1 | 1 | 1 | 1 | 1 | 1 | 1 | 1 |
Fig.1d
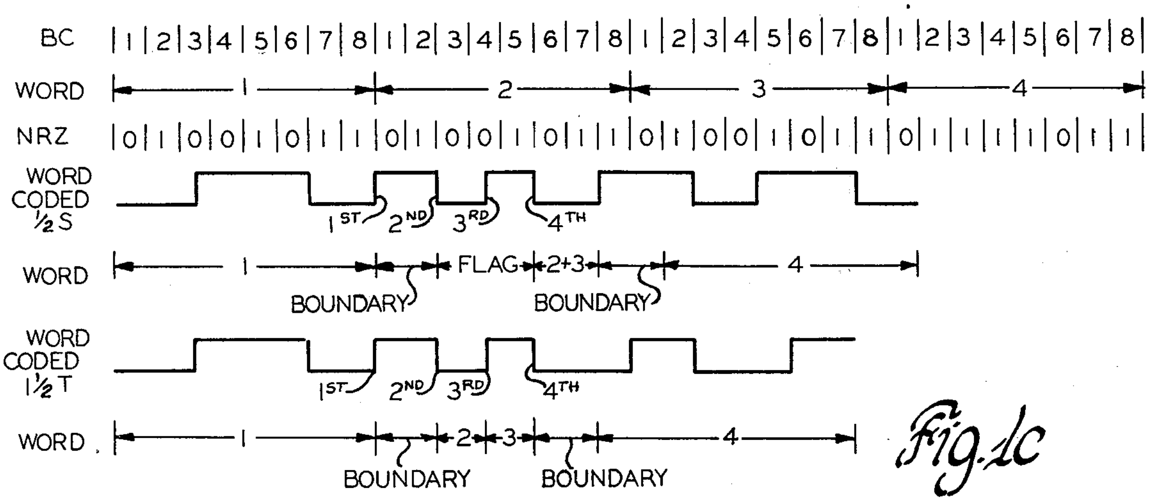
Fig.1c

DATA COMPRESSION METHOD AND APPARATUS

This invention relates to data compression methods and apparatus and more particularly to methods and apparatus for reduced redundancy encoding of binary information.

Data compression is a technique for reducing the bandwidth needed to transmit a given amount of information in a given time or to reduce the time needed to transmit a given amount of information in a given bandwidth. One such data compression technique is disclosed in my copending application Ser. No. 404,231, filed Oct. 9, 1973 and assigned to the assignee of the present invention which is a continuation-in-part of application Ser. No. 292,141, filed Sept. 25, 1972 and now abandoned. The technique disclosed in the aforementioned patent application produces state transitions in the coded output waveform upon identification of discrete pairs of adjacent like bits in the data to be coded. This technique results in a significant increase in the compression of the data to be transmitted or recorded.

It is well known that binary data relating to photography or television or that being transmitted by means of the telecommunication links such as payroll data, program listings, the printed page, digital voice, etc., contain a significant amount of redundant data. Various encoding techniques have been proposed for reducing the redundancy thereby eliminating the wasted transmission time and reducing the operating cost.

One such method is known as run length coding which specifies a reference parameter or run and transmits a code word which specifies the length of the run. One of the problems encountered is run length coding is that if the change density of the data is high a negative compression ratio can result.

It is an object of the present invention to provide methods and apparatus for compression of data which efficiently utilizes the bandwidth capabilities of telecommunication links.

It is another object of the present invention to decrease the bandwidth requirements for transmission of binary information.

It is another object of the present invention to reduce the operating cost of transmitting binary information that includes even relatively small amounts of redundant data.

In accomplishing the above objects Applicant has invented novel methods and apparatus for reducing the redundant information is transmitted digital waveforms. In accordance with the present invention binary information is normally coded in accordance with the bit pair coding technique described in the aforementioned application. The said bit pair coding technique produces a coded output waveform containing transitions which are separated by at least 1½ bit cells and there are never more than two consecutive transitions separated by the 1½ bit time interval. In accordance with the present invention the data being encoded is sampled to identify consecutive words of data which are identical within a predefined tolerance. The first word of redundant data is encoded in accordance with the bit pair coding technique. Thereafter, a unique transitional pattern including at least three consecutive transitions each delayed by 1½ bit cells is transmitted. The three consecutive transitions separated by 1½ bit cells provides a "flag" which indicates that succeeding words in the data are identical with the first word. The duration of a portion of the unique transitional pattern indicates the number of consecutive identical words following the first word. Prior to injecting the flag a leading boundary pulse is established and, likewise, following injection of the flag a trailing boundary is established to segregate the bit pair coded data from the word mode coded data. These boundaries are 2–2½ bit times in width and in addition to segregating, provide the functions of describing the bit state or states of the data which is bit pair coded just prior to entry into the word coding mode and to establish the end and beginning reference points for the data which is bit pair coded.

Two methods are disclosed for implementing the word mode coding. Both transmit the first word in a string of identical consecutive words and use the same leading and trailing boundary schemes. One of the methods uses a ½ bit time space (½S) and requires a minimum of 10 bit times to inject including the boundaries, flag, and coding for one word. With this method, compression can be accomplished on two consecutive words provided that the word length is greater than 10 bits. The other method utilizes a 1½ bit time transition (1½T) for each consecutive word. Its minimum injection time is 7 bit times and requires three consecutive identical words of data before it can be utilized. For long strings of consecutive words, the ½S method approaches a maximum compression ratio on bits-in vs. bits-out basis of 2N, while the 1½T method approaches ⅔N where N is the number of bits contained in the word. These ratios are T increased another 50% attributable to the bit pair coding to provide for a maximum overall compression ratio of 3N for the ½S method and 1N for the 1½T method.

A more complete understanding of the present invention may be had from the following detailed description which should be taken in conjunction with the drawings in which:

FIG. 1*a* is a block diagram of the encoder of the present invention;

FIGS. 1*b*, 1*c*, and 1*d* are waveforms and a table helpful in explaining the invention;

FIGS. 2, 3, and 4 are detailed logic diagrams of the present invention of a preferred embodiment of the encoder;

Figure 2:
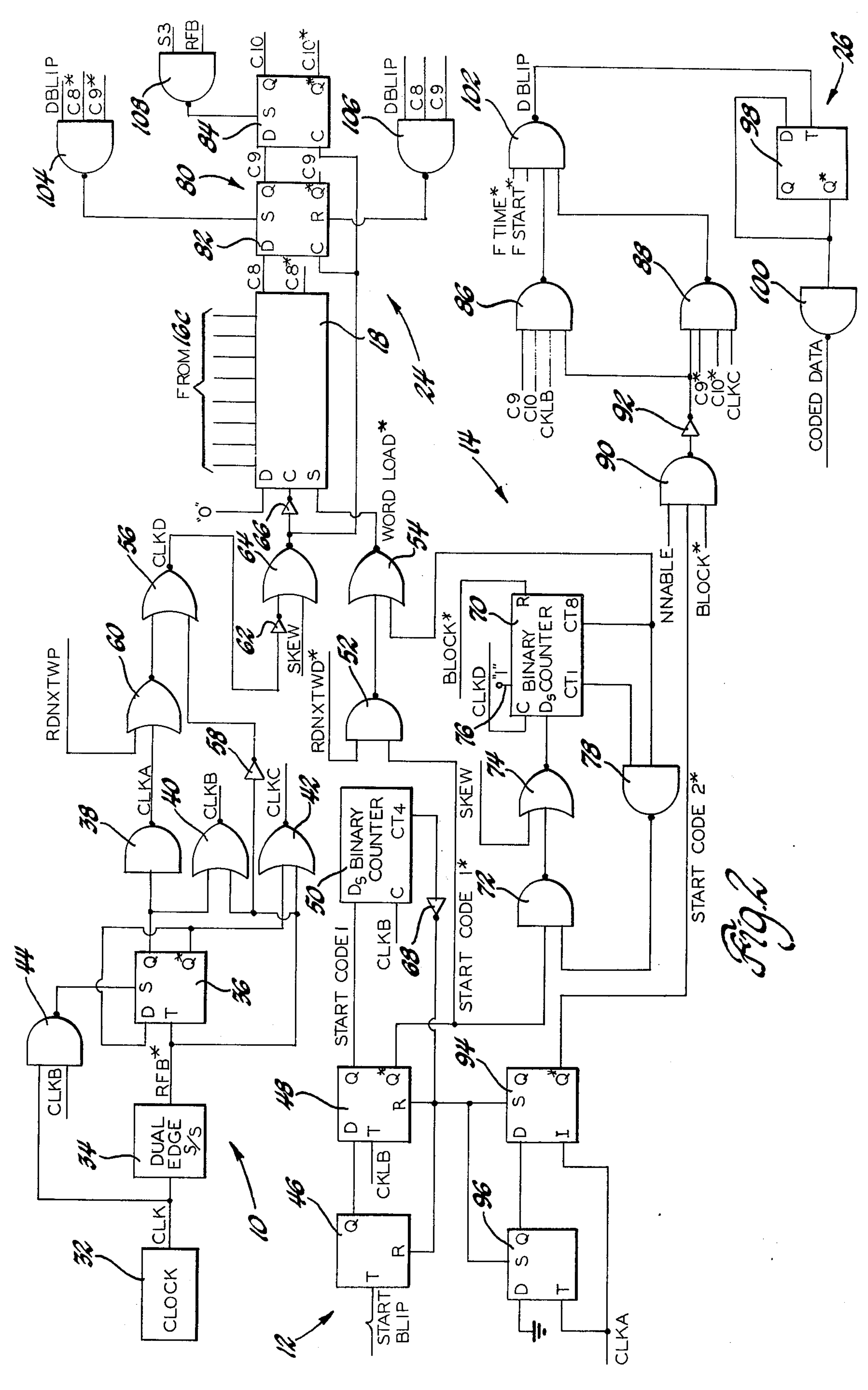

Referring now to the drawings and initially to FIG. 1*a*, the encoder of the present invention includes a clock generator generally designated 10 which supplies timing signals to the various other blocks in FIG. 1 as necessary to maintain proper timing between the blocks. The various timing signals will be considered in connection with the more detailed logic mechanization to be described hereinafter. For the moment, clock generator 10 may be considered as producing clock pulses which define the beginning and middle of some arbitrary bit time interval. Start-up logic generally designated 12 provides an input to data shift control logic 14 which controls the entry of data from a variable rate data source into the encoder and the shifting of the data through the encoder. The variable rate data source is not shown but would include a buffer storage which presents the data to the encoder upon demand. Upon start-up, the input data is parallel shifted word-by-word through three delay registers 16 to a universal shift register 18. The first data word is also entered into a reference register 20 and is compared with the following data word in a word comparator 22. If the first word compares with the second word the first word remains in the reference register 20 and is compared with the following words until the words are dissimilar at which time the new word is entered into the reference register 20 for comparison with succeeding words. After the first word is parallel loaded into the universal shift register 18 the data is shifted out serially to a bit pair comparator 24 where each bit is compared with the following bit to detect discrete pairs of adjacent like bits, i.e. 00 or 11. The comparator 24 is also responsive to the clock pulses from the clock generator 10 and provides input pulses to an output state controller 26 at the beginning or middle of bit time depending on which of the discrete pairs of adjacent like bits are detected. The controller 26 generates the coded output signal. The "discrete pairs" are identified by serially shifting the data bit-by-bit to the comparator 24 and inhibiting the comparator 24 for 1 bit time following detection of a pair of adjacent like bits if the bit following the pair of like bits is also like the pair of bits detected. Thus, in the binary data 0111 the second and third bits form a discrete pair of adjacent like bits but the third and fourth bits are not discrete even though they are a pair of adjacent like bits because the third bit has already been coded. This process is distinguishable from the process of merely sampling successive dibits (two successive bits) to detect pairs of bits of a particular bit configuration. The controller 26 produces transitions in the output signal at the beginning of only those bit cells containing a 1 which is followed by a bit cell containing a 1 and which is not preceded by a bit cell containing a transition and produces transitions at the midpoint of only those bit cells containing a0 which is followed by a bit cell containing a 0 and which is not preceded by a bit cell containing a transition. By producing transitions in the output signal only upon detection of discrete pairs of like bits, significant compression of the data is accomplished. If each discrete pair of like bits in the data is identified the remaining data is known to contain no discrete pairs and is readily identifiable from the state of the discrete pairs of like bits.

The bit pair coding mode of operation may be better understood with reference to the waveforms shown in FIG. 1*b*. The NRZ data to be encoded is 110011001101100011. The data will be shifted into the bit pair comparator 24 beginning with the least significant bit in bit cell 1 (BC1) and ending with the most significant bit in BC18. Bit pair coding of the data produces the waveform so designated in FIG. 1*b*. This data will produce transitions at the beginning of bit cells 1, 6, 9, 13 and 17 thereby identifying the pairs of 1's in bit cells 1–2, 6–7, 9–10, 13–14, and 17–18, and at the middle of bit cells 3, 11, and 15 thereby identifying the pair of 0's in the bit cells 3–4, 11–12, and 15–16. During decoding of the data it will be readily deducible that a 0 occurs in bit cells 5 and 8 since otherwise, a pair of 1's would have been present in bit cells 5–6 and 8–9 and a transition would have occurred at the beginning of bit cells 5 and 8. Thus, all of the data can be recovered by merely causing transitions between state levels on discrete pairs of adjacent like bits. It will be noted that the pair of adjacent like bits in bit cells 4–5 do not produce a transition. This pair of bits is not discrete since a transition occurs in bit cell 3. The detection of the pair of 0's in bit cells 3–4 inhibits a transition from occurring during bit cell 4 when bit 4 would be compared with bit 5. The shortest duration pulse is 1½ bit cells in width and occurs when coding the data in bit cells 11–18 where pairs of zeros are followed by pairs of ones. It is not possible for two pulses of 1½ bit cell width to occur consecutively when coding in accordance with this bit pair coding technique. Any 1½ bit time pulses resulting from bit pair coding will always be preceded and followed by pulses at least 2 bit cells wide as shown in FIG. 1*b*.

As long as the data words are not identical the aforementioned encoding process is continued. However, if a sufficient number of consecutive words are identical the encoder is switched to a word mode of operation wherein only the first of the identical words is bit pair coded, followed by a unique transitional pattern which identifies the number of words which are identical. Referring again to FIG. 1*a*, the unique transitional pattern is produced by an input to the state controller 26 from a word mode pulse generator and control logic 28. The initiation and termination of the pulse generator 28 is under the control of mode control logic 30 which responds to the comparator 22.

The required number of consecutive identical words necessary to enter word mode coding is dependent on several factors including the word length and will be discussed more fully hereinafter. The specific embodiment of the invention as disclosed herein is based on a word length of 8 bits and successive groups of bits are compared on a single word basis. This dictates that at least three consecutive identical words must be present to achieve greater data compression than obtainable from the bit pair coding method.

The word mode coding is initiated after the first of the successive words has been coded in accordance with the bit pair coding technique. Thereafter, the bit pair coding is terminated and data is entered at a significantly increased rate as long as the consecutive words are identical. The comparator 22 may be adjusted so that the consecutive words need not be identical but may vary within a predefined tolerance in order to take advantage of the increased data compression resulting from word mode operation. For example, it may be desirable to overlook the least significant bit of a word if no substantial loss of information results therefrom.

The waveforms in FIG. 1*c* show the word coded output waveform resulting from coding three consecutive identical eight bit words followed by a non-identical eight bit word. The first word is coded as in FIG. 1*b*. Prior to entry of the first word into the universal shift register 18 the three consecutive identical words would have been detected by the comparator 22 and the code control logic 30 informs the word mode pulse generator and control logic 28 and data shift control logic 14 to initiate the word mode coding and generation of the unique transitional pattern after the first of the consecutive identical words has been bit pair coded. The pulse generator 28 generates a pulse train containing five pulses which cause the controller 26 to produce the unique transitional pattern containing five transitions between the two output state levels. As shown in FIG.

1c, word mode coding in accordance with the ½S method produces a first transition which occurs at the trailing boundary of the bit cell containing the last bit of the first or reference word. The second transition is displaced from the first either 2 or 2½ bit cell times. This provides a segregation function for the two types of coding and its width identifies the state of the last bit of the reference word (the bit just prior to the first transition). The second transition is displaced by 2 bit times if the last bit is a 1 and 2½ bit times if the last bit is a 0. With this, the states of the bit pair coded data prior to the first transition, not defined by transitions resulting from detection of discrete pairs of like bits are defined.

In the example given, the transition occurring at the beginning of BC7 identifies the last bit of the reference word. However, if the last bit had been a 0 the only transition in the reference word would have occurred at the middle of BC3. From this transition one can conclude that a 0 occurs in BC1 and a 1 occurs in BC2 but the data in BC5–BC8 could be either 0101 or 1010. The second transition of the unique transitional pattern would then be necessary in order to identify the data as 1010.

The third and fourth transitions provide a flag which signals entry into word mode coding. The third transition is displaced 1½ bit cells from the second transition while the fourth transition is displaced 1½ bit cells from the third transition. The fifth transition is displaced from the fourth transition in accordance with the following formula:

$$2 - \frac{NCGR}{2} + \frac{NCGD}{2}$$

where NCGR is the minimum number of compare groups required for entry into the word coding mode while NCGD is the number of compare groups detected. The (2–NCGR)/2 term locates the point from which a count of ½ bit cells per compare group is to start. The NCGD/2 describes the number of bit cells required to represent the quantity of the data compressed.

The formula is expressed in "compare groups" rather than data words since it is often desirable to utilize multiple data words during the comparison process. The above formula states that the fifth transition will be displaced from the fourth transition by 1½ bit cells plus ½ bit cell for each compare group detected. The requirements for entry into the word coding mode expressed in compare group sizes in multiples of word size is shown in the table in FIG. 1*d*. This table is based on the formula:

$$NCGR \quad \frac{10 + NBR}{NBCG}$$

where NCGR is the number of compare groups required while NBCG is the number of bits in the compare group and NBR is the number of bits in the reference.

For example, if the data word size is eight bits and the compare group size selected is equal to the word size then one compare group in addition to the 8 bit reference is required, i.e. three consecutive identical 8 bit words are required in order to enter the word coding mode. If this "requirement" is not met the data would be more highly compressed by using the bit pair coding mode. In FIG. 1*c*, the width of the pulse formed by the fourth and fifth transitions is 2 bit cell times in duration. This is because the waveform is drawn on the basis of two words per compare group. If compare group size were considered to be word size the duration would be 2½ bit cell times.

Following the fifth transition, a terminating boundary is established which is two bit cell times displaced from the fifth transition, if the fifth transition occurs at the beginning of a bit cell and is 2½ bit cell times displaced from the fifth transition if the fifth transition occurs at the middle of a bit cell. A transition may or may not occur at this time depending on the bit configuration of the next data word. After the 2 or 2½ bit cell time boundary is established the next word of data is encoded in accordance with the bit pair coding technique. By establishing a terminating pulse width of at least 2 bit cell times the unique transitional pattern is segregated from succeeding transitions resulting from bit pair coding.

The waveform generated for word mode encoding utilizing the 1½T technique results in coding of the first word in the same fashion as is accomplished with the ½S technique. In addition, the 2 or 2½ bit cell time leading and trailing boundary requirements are the same as for the ½S method. In the 1½T method 1½ bit cell time pulses are provided for each of the consecutive identical words. In FIG. 1*c* the 1½ bit cell time pulses are formed by the second, third, and fourth transitions.

In FIG. 1*c* both boundaries are 2 bit cell times because of the particular data presented. Each of the boundaries could, of course, be 2½ bit cell times in which event the time necessary to enter the unique transitional pattern using the ½S method would be 10 bit cell times. In the 1½T method the minimum injection time is 7 bit cell times, i.e., at least two 1½ bit cell time pulses and minimum boundaries of two bit cell times each. Since the 1½T method uses the flag as part of the data coding at least three consecutive identical words are required to enter the word mode regardless of the number of bits in the compare group. Between the ½S and 1½T methods the injection efficiency breakpoint is at five consecutive words where the 1½T method is more efficient up to the breakpoint. It will be noted in FIG. 2*c* that the 1½T word coding method provides greater data compression than the ½S method for the particular data encoded. However, for long strings of consecutive words the ½S method approaches a maximum compression ratio on a bits-in vs. bits-out basis of approximately 3 times that provided by the 1½T method.

Figure 3:
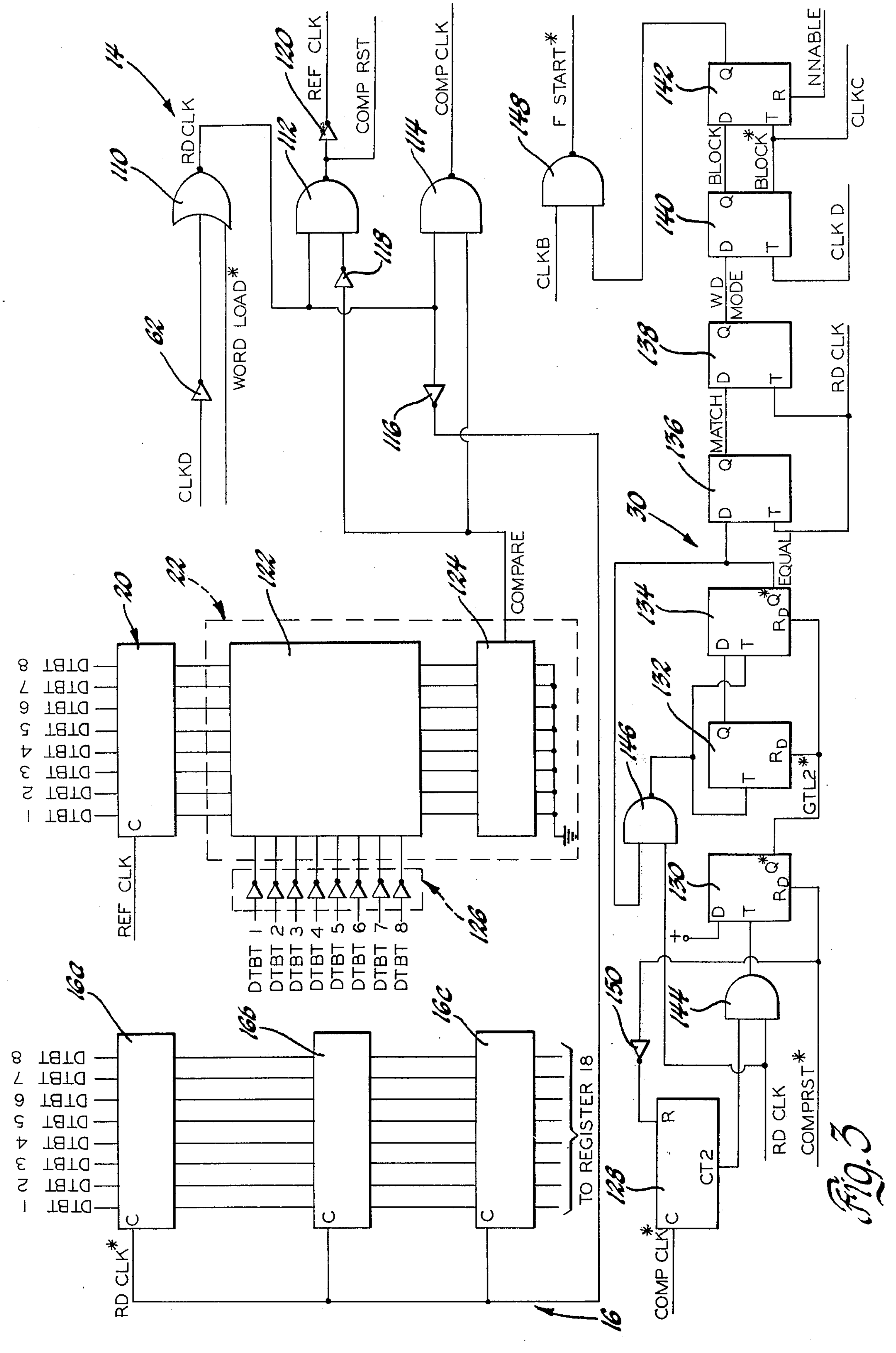
Figure 4:
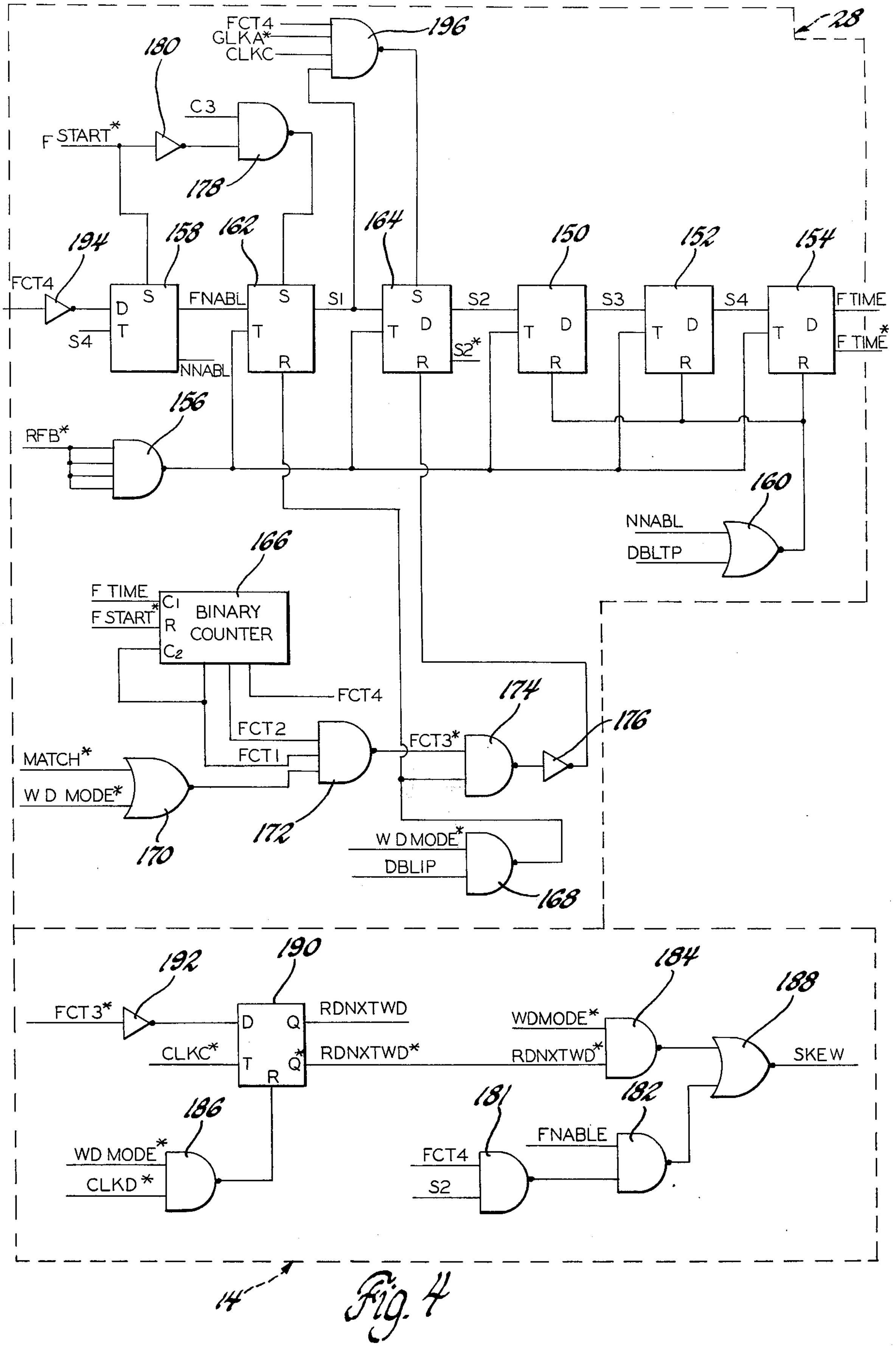
Figure 5:
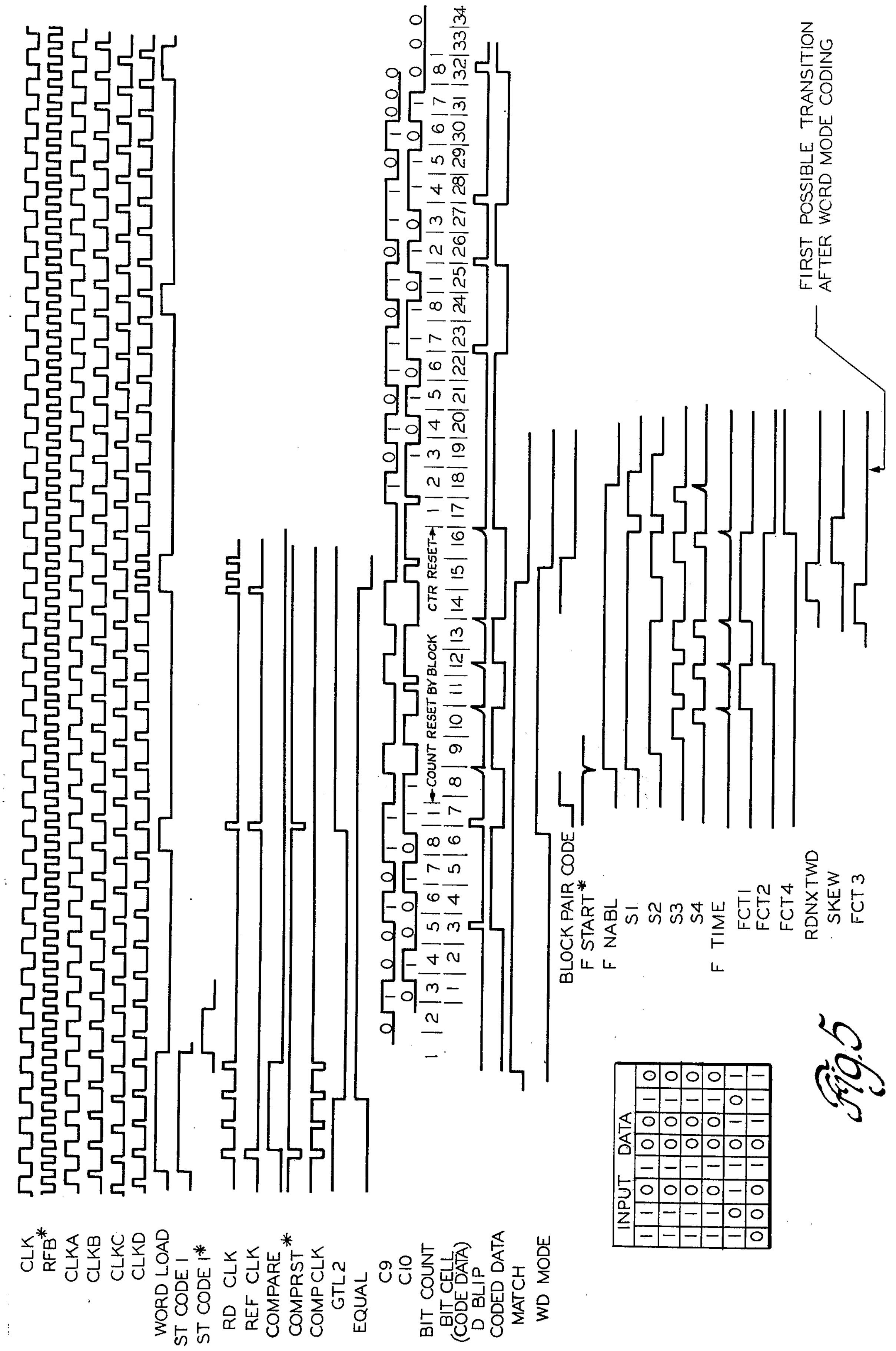
FIG. 5 shows waveforms appearing at various points in the diagram of FIGS. 2, 3, and 4 and shows the coded output waveform for the six 8 bit words listed in the figure.

Referring now to FIGS. 2, 3, and 4 the detailed logic for the encoder will be described with reference to the waveforms shown in FIG. 5 and the encoding of the six 8 bit words listed in FIG. 5. The clock generator 10 develops clock pulses designated CLKA, CLKB, CLKC, and RFB*. The clock generator 10 comprises a basic clock 32 the output of which is shown in the CLK waveform and which drives a dual edge single shot 34 to produce the signal RFB* which contains negative going pulses coinciding with each rising and falling edge of the basic clock output. The single shot 34 toggles a delay flip-flop 36, the Q output of which is inverted by a NAND gate 38 to produce the signal CLKA. NOR gates 40 and 42 have one input connected with RFB* and the other input connected with the Q and Q* outputs respectively of the flip-flop 36 to produce a CLKB and CLKC signal. NAND gate 44 responds to the output of the clock 32 and the CLKB signal to set the delay flip-flop 34 to insure the relative phase of the CLKA, CLKB and CLKC signals as shown in the waveforms.

The start-up logic 12 includes a delay flip-flop 46 which responds to a power-on initialization circuit (not shown). The initialization circuit produces a pulse designated START BLIP which toggles the flip-flop 46 and causes its Q output to go high. A delay flip-flop 48 is toggled on the rising edge of CLKB* (CLKB* designates the inverted CLKB signal) to raise its Q output designated START CODE 1. START CODE 1 is applied to the direct set (DS) input of a binary counter 50 which is clocked on the falling edge of CLKB. The counter 50 is set to a count of 0 while START CODE 1 is low and is held in this set condition until START CODE 1 goes high. The counter 50 thereafter is clocked by CLKB and its function is to keep track of the number of advance shift pulses to the delay register 16. START CODE 1* is applied as one input to a NAND gate 52 of the shift control logic 14. The output of the gate 52 supplies one input to a NOR gate 54 the output of which is designated WORD LOAD* which controls the shift mode of universal shift register 18. The register 18 is clocked by a signal designated CLKD which is derived from CLKA and RFB*. The CLKD signal appears at the output of a NOR gate 56 which has one input connected to RFB* through an inverter 58 and the other input connected with a NOR gate 60 having one input connected to CLKA. The gates 60 and 52 are controlled by a signal designated RDNXTWD (read next word). The CLKD signal is applied through an inverter 62, a NOR gate 64, and an inverter 66 to the clock input C of the register 18. The register 18 is clocked on the falling edge of the signal applied to its C input which coincides with the rising edge of CLKD due to the invention performed by the elements 62, 64, and 66. RDNXTWD is low during bit pair coding thereby enabling the gate 60 so that the CLKD signal follows RFB during the time CLKA is high. During the word mode coding when it is desired to increase the rate at which data is supplied to the encoder, RDNXTWD is driven high to close the gate 60 so that CLKD follows RFB. RDNXTWD* is high during start-up so that when START CODE 1* goes low, WORD LOAD* goes low to condition the register 18 for parallel data entry. As the first data word is entered into the register 18 the counter 50 will reach a count of 4 and its CT4 output will go high. The CT4 output is inverted by an inverter 68 and resets the flip-flop 46 and 48 to terminate the start-up operation and to drive START CODE 1* high and WORD LOAD* high to condition the register 18 for serial shifting. NOR gate 64 is controlled by a signal designated SKEW which is normally low to enable the gate 64 but is driven high during the latter portion of the word mode coding to disable the gate 64 and prevent clocking of the shift register 18. The logic for generating the SKEW signal will be described hereinafter.

START CODE 1* is also applied to the direct set (DS) input of a binary counter 70 through a NAND gate 72 and NOR gate 74. The counter is clocked on the falling edge of CLKD. The counter 70 may be programmed from parallel inputs (not shown) but schematically represented by the single input 76. The parallel inputs are tied to appropriate logic levels to establish a count to which the counter 70 is set when its DS input is driven low. This count may be expressed as 9-*n* where *n* equals the bits per word. In the present instance when the DS input is driven low a count of 1 is established in the counter 70 driving CT1 high. The function of the counter 70 is to keep track of the number of clock pulses applied to the shift register 18 during its serial mode of operation so that it may be shifted to its parallel mode of operation at the appropriate time.

After seven bits are shifted out of the register 18 the CT8 output of the counter 70 goes high since the counter 70 was previously set to a count of 1. When CT8 goes high it drives WORD LOAD* low through the gate 54 to condition the register 18 for parallel entry. The next CLKD pulse enters the second word into the register 18 and clocks the counter 70 to a count of 9 wherein both the CT1 and CT8 outputs are high. The CT1 and CT8 outputs provide inputs to a NAND gate 78 the output of which is driven low when the counter 70 reaches a count of 9 which drives the DS input of the counter 70 low to reset the counter to a count of 1.

The comparator 24 includes a two bit register 80 comprising flip-flops 82 and 84 which are toggled on the rising edge of CLKD. The D input to the flip-flop 82 is connected with the output of the last stage C8 of the register 18. The D input to the flip-flop 84 is connected with the Q output of the flip-flop 82 designated C9. The Q output of the flip-flop 84 is designated C10. The Q* outputs of the flip-flops 82 and 84 are designated C9* and C10* respectively. The comparator 24 further includes a pair of NAND gates 86 and 88. The gate 86 samples the state of the data at the C9 and C10 outputs of flip-flops 82 and 84 on the rising edge of CLKB. CLKB establishes the beginning of bit time of the coded output data and, accordingly, the output of the gate 86 will go low at the beginning of bit time if the data stored in the flip-flops 82 and 84 and appearing at their C9 and C10 outputs are logic 1's. The gate 88 samples the data appearing at the C9* and C10* outputs of the flip-flops 82 and 84 respectively on the rising edge of CLKC. CLKC establishes the middle of bit time of the coded output signal. Accordingly, the output of the gate 88 will go low if the two bits stored in the register 80 are logic 0's. The gates 86 and 88 are controlled from a NAND gate 90 through an inverter 92. The inputs to the gate 90 are designated N NABL, START CODE 2*, and BLOCK*. If all inputs to the gate 90 are high the gates 86 and 88 are enabled. The logic for generating the N NABL and BLOCK* signals will be described hereinafter. The START CODE 2* signal is obtained from a flip-flop 94 in the start-up logic 12. The flip-flop 94 has its D input connected with the Q output of a flip-flop 96 which has its D input tied to logic 0. The flip-flops 94 and 96 are toggled on the rising edge of CLKA and are set by the counter 50 through the inverter 68 when the first data word is entered into the register 18 driving START CODE 2* low thereby disabling the gates 86 and 88. START CODE 2* will be driven high on the rising edge of CLKA as the second bit of the first data word is shifted into the register 80 whereupon the sampling of the bit states of the data is commenced.

The output state controller 26 includes a delay flip-flop 98 and a buffer gate 100. The Q* output and the D input of the flip-flop 98 are tied together so that the Q* output alternates between logic 1 and logic 0 levels with successive toggling of the flip-flop 98. The flip-flop 98 is toggled by a signal designated D BLIP appearing at the output of a NAND gate 102 having inputs connected with the output of the gates 86 and 88. Accordingly, the flip-flop 98 is toggled at the beginning or middle of bit time if a pair of like bits appear in the register 80 depending on whether the pair is 11 or 00 respectively. Two other inputs are provided to the gate 102 and are designated F TIME* and F START*. These signals are generated by the word mode pulse generator and control logic 28 and will be described hereinafter. NAND gates 104 and 106 are provided for respectively setting and resetting the flip-flop 82. If the bit in the bit time immediately following a D BLIP is the same as the preceding pair of bits which produced the D BLIP. For example, if C9 and C10 are both 1's and produce a D BLIP then the flip-flop 82 will be reset driving C9 to a 0 if C8 is a 1. Similarly, if C9 and C10 are both 0's and a D BLIP is produced then the flip-flop 82 will be set driving C9 to a 1 if C8 is a 0. By setting or resetting the flip-flop 82 the bit pair coding of the data is inhibited for 1 bit time following detection of a pair of like bits. This results in the detection of only discrete pairs of like bits. NAND gate 108 is enabled from the word mode pulse generator 28 to set the flip-flop 84.

Referring now to FIG. 3, the shifting of input data through the delay register 16 and the comparison of successive words will be described. The shift control logic 14 further includes a NOR gate 110 and NAND gates 112 and 114. The CLKD* signal appearing at the output of inverter 62 is AND'ed with WORD LOAD* in the gate 110 to produce the signal designated RDCLK. Thus, during start-up while WORD LOAD* is low RDCLK follows CLKD. The RDCLK signal is inverted by an inverter 116 and applied to the clock input of the three delay registers **16*a*, 16*b* and 16*c*. The RDCLK signal is AND'ed in the gate 112 with the output of the word comparator 22 through an inverter 118. The output of the comparator is designated COMPARE and is driven high when consecutive words are identical. The output of the gate 112** is designated COMPRST* and is a mirror image of the RDCLK signal as long as consecutive words are not identical. The output of the gate 112 is inverted by an inverter 126 to produce the output designated REFCLK which is a replica of the RDCLK signal as long as consecutive words are not identical. The delay registers **16*a*–16*c*** are clocked on the falling edge of RDCLK* (rising edge of CLKD) while the register 20 is clocked on the falling edge of REFCLK (falling edge of CLKD). Since the register 20 is shifted after the register **16*a*, a data word (DTBT1-DTBT8) is shifted to the output of the register 16*a* and a new word is present at the input to the register 16*a* before the first word is shifted to the output of the register 20. When the data is shifted to the output of the register 20 it is applied to one input of the word comparator 22. The comparator 22 is a binary subtractor comprising a full adder 122 and a magnitude comparator 124. The first data word is added with the complement of the succeeding data word produced by the inverters 126. When two consecutive words are identical the 8 bit answer will be 0. The answer is compared with 0 in the magnitude comparator 124 driving the signal COMPARE high. The tolerance on the comparator 22 may be changed by merely grounding one or more of the inputs to the magnitude comparator 124 from the adder 122. The first RDCLK pulse which shifts the first word into the register 16*a*** produces the pulse COMPRST* since at this time COMPARE would be low.

The mode control logic 30 comprises a binary counter 128, delay flip-flops 130–142, and NAND gates 144, 146 and 148. The COMPRST* signal is driven low on the rising edge of RDCLK whenever consecutive words are not identical and resets flip-flop 130 driving its Q* output designated GTL2* high to release the direct reset on flip-flops 132 and 134. COMPRST* also resets the counter 128 to a count of 0 through an inverter 150. When two consecutive identical words are encountered, COMPARE is driven high, the gate 114 is enabled, and the gate 112 is disabled. With the gate 112 disabled the reference register 20 is no longer clocked so that the word stored in the register 20 is retained for subsequent comparison with succeeding words. With the gate 114 enabled the counter 128 is clocked on the falling edge of the COMPCLK* signal. The counter 128 is thus clocked simultaneously with the counters **16*a*–16*c* after the first of the two consecutive identical words has been entered in the register 16*a*. The counter 128 keeps track of the data words as they are shifted through the registers 16*b* and 16*c*. As previously indicated three consecutive identical words are required in order to enter the word coding mode where the word is 8 bits in length and compare groups are equal to one word. When three consecutive identical words occur the CT2 output of the counter 128 will go high when the three words are loaded into the registers 16*a*,** 16*b*, and **16*c* respectively to enable the gate 144. With the gate 144 enabled the RDCLK pulse causes the flip-flop 130** to be toggled driving GTL2* low to reset the delay flip-flops 132 and 134 driving the Q* output of the flip-flop 134 designated EQUAL high. When EQUAL goes high gate 146 is enabled so that flip-flops 132 and 134 may be toggled from the RDCLK signal. The flip-flops 132 and 134, however, cannot change states until the direct reset is released, i.e. until GTL2* is driven high by COMPRST* resetting the flip-flop 130. This will occur as the first non-identical word is shifted into the register **16*a* because at that time COMPARE will be low having been driven low when the first non-identical word appeared at the input to the register 16*a*. The two delay flip-flops 132 and 134 cause EQUAL to go low as the first non-identical word is shifted into the register 16*c*. The EQUAL signal is used to condition the flip-flop 136. Upon entry of the first of three consecutive identical words into the register 18 (FIG. 2) the flip-flop 136 is clocked to cause the signal MATCH to go high. With MATCH high the flip-flop 138** is conditioned to drive WDMODE high and WDMODE* low on, as the next word is shifted into the register 18. The flip-flop 140 is toggled as the first bit of the second word is shifted out of the register 18 to drive BLOCK high and BLOCK* low to inhibit the bit pair comparator 24 through the gate 90 to prevent comparison between the last bit of the first word and the first bit of the last word. Also, BLOCK* resets the counter 70 to a count of 0. On the rising edge of CLKC, just prior to shifting the second bit of the second word out of the register 18, the flip-flop 142 is toggled to enable the gate 148. On the rising edge of the next CLKB pulse F START* is driven low to produce a transition in the output signal at the beginning of bit time through gate 102 (FIG. 2).

Referring now to FIG. 4, the F START* signal controls the word mode pulse generator and control logic 28. The word mode pulse generator 28 is 1½ bit time pulse generator comprising flip-flops 150, 152 and 154 which are toggled from RFB* through a NAND gate 156. RFB* operates at twice bit rate frequency so that the logic level at the input to the flip-flop 150 will appear at the output of flip-flop 154 after an interval of 1½ bit cell times. Flip-flop 158 is set from F START* driving its Q output designated F NABL high and its Q* output designated N NABL low to initiate the generation of the unique transitional pattern. When N NABL goes low a NOR gate 160 is enabled to permit the flip-flops 150-154 to be reset by D BLIP each time a transition in the output data occurs. Flip-flops 162 and 164 are interposed between flip-flops 158 and 150 to control the leading and trailing boundaries of the unique transitional pattern. F START* also resets a binary counter 166 which is clocked by the Q output of the flip-flop 154 designated F TIME. The function of the counter 166 is to keep track of the consecutive 1½ bit cell time pulses forming the flag in the unique transitional pattern. The reset input of the flip-flop 162 is controlled by WDMODE* and D BLIP through a NAND gate 168. The reset input of the flip-flop 164 is controlled by logic including NOR gate 170, NAND gates 172 and 174 and inverter 176.

As previously indicated the leading boundary between the first and second transitions in the unique transitional pattern is either 2 or 2½ bit times depending on the state of the last bit of the first or reference word. At the time F START* is driven low the last bit of the second word is present at the C3 output of the shift register 18 and since the second word is the same as the first word the state of C3 is sampled by NAND gate 178. If C3 is high F START* sets the flip-flop 162 through inverter 180 and the NAND gate 178 to drive its S1 output high. The flip-flops 162 and 164 are also toggled from RFB* so that setting of flip-flops 162 will cause F TIME* to go low and cause a transition in the output data 2 bit cell times after F START* goes low. On the other hand, if C3 is low the flip-flop 162 will not be set and 2½ bit cell times will elapse before F TIME* goes low.

The shift control logic 14 further includes NAND gates 181, 182, 184 and 186, a NOR gate 188 and a flip-flop 190. When F START* goes low to reset the counter 166 its FCT4 output is driven low to drive the output of gate 180 high. Also, since F START* sets the flip-flops 158 F NABL is high so that the output of the gate 182 is low to enable the gate 188. Each time F TIME* goes low, F TIME goes high and on the falling edge of F TIME the counter 166 is clocked. The three consecutive transitions establishing the two consecutive 1½ bit time pulses are counted by the counter 166 and as the third of the three consecutive transitions occurs the output of the gate 172, designated FCT3* is driven low to reset the flip-flop 164. Flip-flop 164 is held reset by FCT3* until the last consecutive word is loaded into the register 18. At that time MATCH* goes high and the reset to flip-flop 164 is released. This allows the flip-flops 164 and 150–154 to ripple and cause a D BLIP, i.e. the fifth transitions, to occur 1½ bit cell times after the first non-identical word is shifted into the register 18. Thus, the width of the pulse between the fourth and fifth transitions in the unique transitional pattern is 1½ bit cells plus ½ bit cell for each consecutive identical word. The output of the gate 172 is applied through an inverter 192 to condition the input of flip-flop 190, the Q output of which is designated RDNXTWD (read next word). After the three consecutive transitions separated by 1½ bit times the flip-flop 190 is toggled to close the gate 60 and drive WORD LOAD* low through the gates 52 and 54 (FIG. 2) which causes the succeeding words of data to be entered each half bit cell time. The mode control logic 30 (FIG. 3) causes WDMODE to go low and WDMODE* to go high when the first non-identical word is loaded into the register 18. When the flip-flop 190 is reset SKEW is driven high through the gates 184 and 188. The SKEW signal disables the registers 18 and 80 to prevent shifting of the first non-identical word out of the register 18 during the completion of the word mode coding. When WDMODE* goes high the gate 168 is enabled so that the D BLIP producing the fifth transition resets the flip-flop 162 and 164 in addition to resetting the flip-flop 150–154 and clocking the counter 166 to drive FCT4 high. When FCT4 goes high the input to the flip-flop 158 goes low through the inverter 194. The time of occurrence of FCT4 determines the width of the trailing boundary of the unique transitional pattern. The width is established by either setting or not setting the flip-flop 164 as determined by a NAND gate 196. The inputs to the gate 196 are FCT4, CLKA*, CLKC and S1. If FCT4 occurs at the beginning of bit time then CLKA* and CLKC will both be high and, accordingly, the flip-flop 164 will be set upon toggling of the flip-flop 162 so that 3 half bit times later S4 will go high to toggle the flip-flop 158 driving F NABL low and N NABL high which resets the flip-flops 150, 152, and 154 through the gate 160 and also enables the bit pair comparator 24. Just prior to N NABL going high, while S3 is still high, the gate 108 (FIG. 2) sets the flip-flop 84 driving C10 high to insure that a pair of 0's are not present in the register 80 at the time the comparator 24 is enabled. The output of the gate 180 is driven low to drive SKEW low when S2 goes high following a high on FCT4 to thereby enable the gate 64 (FIG. 2) and permit the registers 18 and 80 to be clocked. With the bit pair comparator enabled the data in the register 18 is bit pair coded.

If on the other hand, FCT4 goes high at the middle of a bit time the flip-flop 164 is not set and N NABL is driven high ½ bit time later so that the next transition permitted in the output data occurs at the beginning of bit time. A transition may or may not occur depending on the state of the data shifted into the register 80.

The data is bit pair coded until three consecutive identical words are detected whereupon word mode coding is commenced as described above.

The start-up of the encoder and the coding of the six 8 bit words listed on FIG. 5 will now be described with reference to FIGS. 2–4 and the waveforms in FIG. 5 and in particular to the CLKD waveform. On the falling edge of CLKB following a START BLIP pulse, WORD LOAD* is driven low to condition the register 18 for parallel entry. On the rising edge of CLKD the first word of the six 8 bit words is shifted into the register 16*a*, the flip-flop 130 is reset to release the flip-flops 132 and 134 and the counter 128 is reset to a count of 0. On the falling edge of CLKD the first data word is shifted into the reference register 20 and is compared with the second data word appearing at the input to the register 16*a*. Since these two words are identical, COMPARE is driven high. On the falling edge of the next CLKB pulse the binary counter 50 reaches a count of 1. On the rising edge of the next CLKD pulse the first word is shifted into the register 16*b* and the second word is shifted into the register 16*a* and the counter 128 reaches a count of 1. On the falling edge of the next CLKB pulse the counter 50 reaches a count of 2. On the rising edge of the next CLKD pulse the first word is shifted into the register 16*c*, the second word is shifted into the register 16*b* and the third word is shifted into the register 16*a* and the counter 128 reaches a count of 2 and the flip-flop 130 is toggled thereby resetting the flip-flops 132 and 134 driving EQUAL high. On the falling edge of the following CLKB pulse the counter 50 reaches a count of 3. On the rising edge of the following CLKD pulse the first word is shifted into the register 18, the second word is shifted into the register 16*c*, the third word is shifted into the register 16*b* and the fourth word is shifted into the register 16*a*, and the flip-flop 136 is toggled driving MATCH high. As the fourth word is entered into the register 16*a*, the fifth word, which is not identical with the first or reference word appears at the input to the register 16*a* and COMPARE goes low. On the falling edge of the next CLKB pulse the counter 50 reaches a count of 4 which resets the flip-flop 46 to shut down the start-up circuitry, resets the flip-flop 48 driving WORD LOAD* high to condition the register 18 for serial shifting of the data, sets the binary counter 70 to a count of 1, and sets the flip-flops 94 and 96 driving START CODE 2* low to inhibit the bit pair comparator 24. When WORD LOAD* goes high the gate 110 is closed thereby preventing further data word entry into the register 16*a*. On the rising edge of the next CLKD pulse the first bit of the first word is shifted into the flip-flop 82, and the flip-flop 96 is toggled. On the falling edge of this CLKD pulse the counter 70 is clocked to a count of 2. On the rising edge of the next CLKD pulse the flip-flop 94 is toggled and the first bit of the first word is shifted into the flip-flop 84 and the second bit of the first word is shifted into the flip-flop 82.

When the flip-flop 94 is toggled START CODE 2* is driven high to enable the bit pair comparator 24. On the falling edge of the CLKD pulse the counter 70 reaches a count of 3 and the simultaneous rising edge of CLKB samples the data at C9 and C10 to determine if the first two bits are a pair of 1's. The rising edge of CLKB also establishes the beginning of bit cell 1 (BC1) of the coded output signal. On the following rising edge of CLKC the data in the register 80 is sampled to determine if the first two bits of data are a pair of 0's, i.e. are the outputs C9* and C10* both logic 1. The rising edge of CLKC establishes the middle of BC1 of the output signal. Subsequent CLKD pulses shift the data from the register 18 to the register 80 and clock the counter 70. At the middle of BC3 a pair of 0's are stored in the register producing a D BLIP pulse coinciding with CLKC and a transition occurs at the middle of BC3 of the output data. At the beginning of BC6 the counter 70 reaches a count of 8 causing CT8 to go high driving WORD LOAD* low to condition the register 18 for parallel entry and enable the gate 110 to permit the registers 16*a*–16*c* and 20 to be clocked. On the rising edge of the next CLKD the flip-flop 82 is toggled to shift the last bit of the first word, appearing at the C8 output of the register 18, into the flip-flop 82 and to shift the second word of data into the register 18, the third word of data into the register 16*c*, the fourth word of data into the register 16*b*, and the fifth word of data into the register 16*a*. The flip-flop 130 is reset by the COMPRST* pulse to release the direct reset on the flip-flops 132 and 134 and reset the counter 128 to a count of 9. Also, the flip-flop 138 is toggled driving WORD MODE high. When WORD MODE goes high gate 172 is enabled through gate 170 and gate 168 is disabled thereby releasing the reset on flip-flop 164. On the falling edge of the CLKD pulse the fifth word of data is shifted into the register 20 and the flip-flop 132 is toggled through the gate 146 and the counter 70 is clocked to a count of 1 causing CT8 to go low and WORD LOAD* to go high and close the gate 110 to inhibit further clocking of the registers 16*a*–16*c* and 20. At the beginning of BC7 a pair of 1's are stored in the register 80 causing a transition in the output data on the rising edge of CLKB at the beginning of bit cell time. On the next rising edge of CLKD the flip-flop 140 is toggled causing BLOCK to go high and BLOCK* to go low to reset the binary counter 70 to a count of 0 and also inhibit the bit pair comparator 24 through gate 90 and inverter 92. BLOCK* thus prevents a comparison between the 8th bit of the first or reference word and the first bit of the second word when the first bit of the second word is subsequently shifted into the register 80. With BLOCK high the next rising edge of CLKC toggles the flip-flop 142 to enable NAND gate 148. On the rising edge of the next CLKD pulse the second bit of the second word is shifted into the register 80 and the last bit of the second word appears at the C3 output of the register 18. Since the first two words are identical the last bit of the second word is used to identify the last bit of the first word. Since the last bit of the first word is 1 the gate 178 is enabled. After the flip-flop 142 is toggled on the rising edge of CLKC the next rising edge of CLKB at the beginning of BC9 drives F START* low through gate 148 which sets the flip-flops 158 and 162 driving F NABL and S1 high and N NABL low thereby releasing the flip-flops 150, 152, and 154 through the gate 160 and resetting the flip-flop 142 to disable the gate 148. F START* also resets the counter 166 to a count of 0 which releases the reset on flip-flop 164 through the gates 172, 174 and the inverter 176. With the FCT4 output of the counter 166 low the input to the flip-flop 158 is high and the gate 196 is disabled to release the set input to the flip-flop 164. In addition, the F START* pulse produces a D BLIP pulse through the gate 102 which toggles the flip-flop 98 causing a transition in the coded output data at the beginning of BC9. The flip-flops 162, 164, 150–154 are subsequently toggled by the RFB* signal through the gate 156. The RFB* pulses occur at twice bit rate frequency. After 2 bit cell times F TIME will be driven high and F TIME* will be driven low producing a D BLIP pulse through the gate 108 and a transition in the output data at the beginning of BC11. The D BLIP pulse produced by the F TIME pulse resets the flip-flops 150, 152, and 154 through the gate 160 driving F TIME low which clocks the counter 166 driving FCT1 high. Three half bit cell times later the high at S2 is shifted to F TIME and F TIME* once again goes low causing a transition in the coded data. The flip-flops 150, 152 and 154 are again reset and the register 166 is clocked driving FCT2 high and FCT1 low. Three half bit times later F TIME* once again goes low to cause a transition in the output data and reset the flip-flops 150, 152 and 154 which clocks the counter 166 to a count of 3 which places all inputs to the gate 172 high causing FCT3* to go low which resets the flip-flop 164 through gate 174 driving S2 low. Also, with FCT3* low the input to the flip-flop 190 from the inverter 192 is high so that on the falling edge of the next CLKC pulse the flip-flop 190 is toggled to cause RDNXTWD to go high and RDNXTWD* to go low which drives WORD LOAD* low through the gates 52 and 54 to enable the register 18 for parallel data entry. Also, the gate 56 is continuously enabled from gate 60 as long as RDNXTWD is high so that CLKD pulses are produced at the frequency of RFB*, i.e. at twice the rate the data was previously shifted through the registers *16a–16c*. On the rising edge of the CLKD pulse occurring during BC14 the sixth and last word is entered into the register *16a* and on the falling edge of this CLKD pulse the flip-flop 134 is toggled to drive EQUAL low. On the rising edge of the next CLKD pulse the last of the four equal words is loaded into the register 18 and the flip-flop 136 is toggled to cause MATCH to go low which drives FCT3* high through gates 170 and 172 to release the reset input on flip-flop 164. Coincident with the falling edge of this CLKD pulse S2 is toggled high. On the rising edge of the next CLKD pulse the flip-flop 138 is toggled to cause WORD MODE to go low and the fifth word which is not identical with the previous words nor with the sixth word is loaded into the register 18. With WORD MODE low, WORD MODE* is high to enable NAND gate 186 so that on the falling edge of the third CLKD pulse during WORD LOAD, flip-flop 190 is reset driving RDNXTWD* high to condition the register 18 through the gates 52 and 54 for serial shifting. F NABL is high and since FCT4 is low the output of gate 181 is high and the output of gate 182 is low. Since WORD MODE* is high, when RDNXTWD* goes high the output of gate 184 goes low driving the signal SKEW high to set the binary counter 70 through gate 74 to a count of 1, and to close the gate 64 to prevent clocking of the register 18 or register 80 during termination of the word mode coding. 1½ bit times after WORD MODE goes low, F TIME* goes low to produce the transition at the beginning of BC17. Since S2 was held low for 3 half bit cell times by FCT3*, the width of the pulse following the 3 transition flag is 3 bit times to code the fact that the three consecutive words following the word coded during BC1-BC8 are identical with that word. When F TIME* goes low the flip-flops 162, 164 and 150–154 are reset and the counter 166 is clocked driving FCT4 high. Since this occurs at the beginning of bit time the flip-flop 164 will be set ½ bit cell times later through gate 196 and SKEW will be driven low through gates 181 and 182 to open gate 64 and permit clocking of registers 18 and 80. ½ bit cell time later S3 goes high to set flip-flop 84 through gate 108. When S4 goes high ½ bit cell time later the N NABL is driven high to release the flip-flop 142, enable the bit pair comparator 24, and reset the flip-flops 150–154. At the beginning of BC19 the second bit of the fifth word is shifted into flip-flop 82 and defines the beginning of BC1 of the fifth word. The fifth and sixth words are then bit pair coded to produce transitions at the beginning of BC23, BC26, and BC28 and at the middle of BC32.

It will be noted that the 48 bits in the original data have been compressed to represent the same data in only 34 bit cells and further that while the original waveform contains transitions separated by only one bit cell time the transitions in the coded waveform are separated by at least 1½ bit cell times.

The coded data output of the gate 100 (FIG. 2) may be utilized to record the data on magnetic tape or applied to a communication link either directly or after phase or frequency modulation of a carrier. The apparatus for recording the information on a magnetic medium is not disclosed in detail but is well known by those skilled in the art. For example, the output of the gate 100 would be amplified and utilized to drive a recording head which affects the writing on at least one lineal track of the medium during relative movement between the track and the head. The recording medium exhibits a hysteresis characteristic having two stable states of remanents comprising two directions of magnetic orientation of portions on the medium. The magnetic head effects writing on the medium by creating magnetic fields in one or the other of the two directions and switching the direction in accordance with the output of the gate 100. The recording medium is normally broken up into a plurality of imaginary equal length bit cells which serve as identifying boundaries for each binary bit of information.

Figure 6:
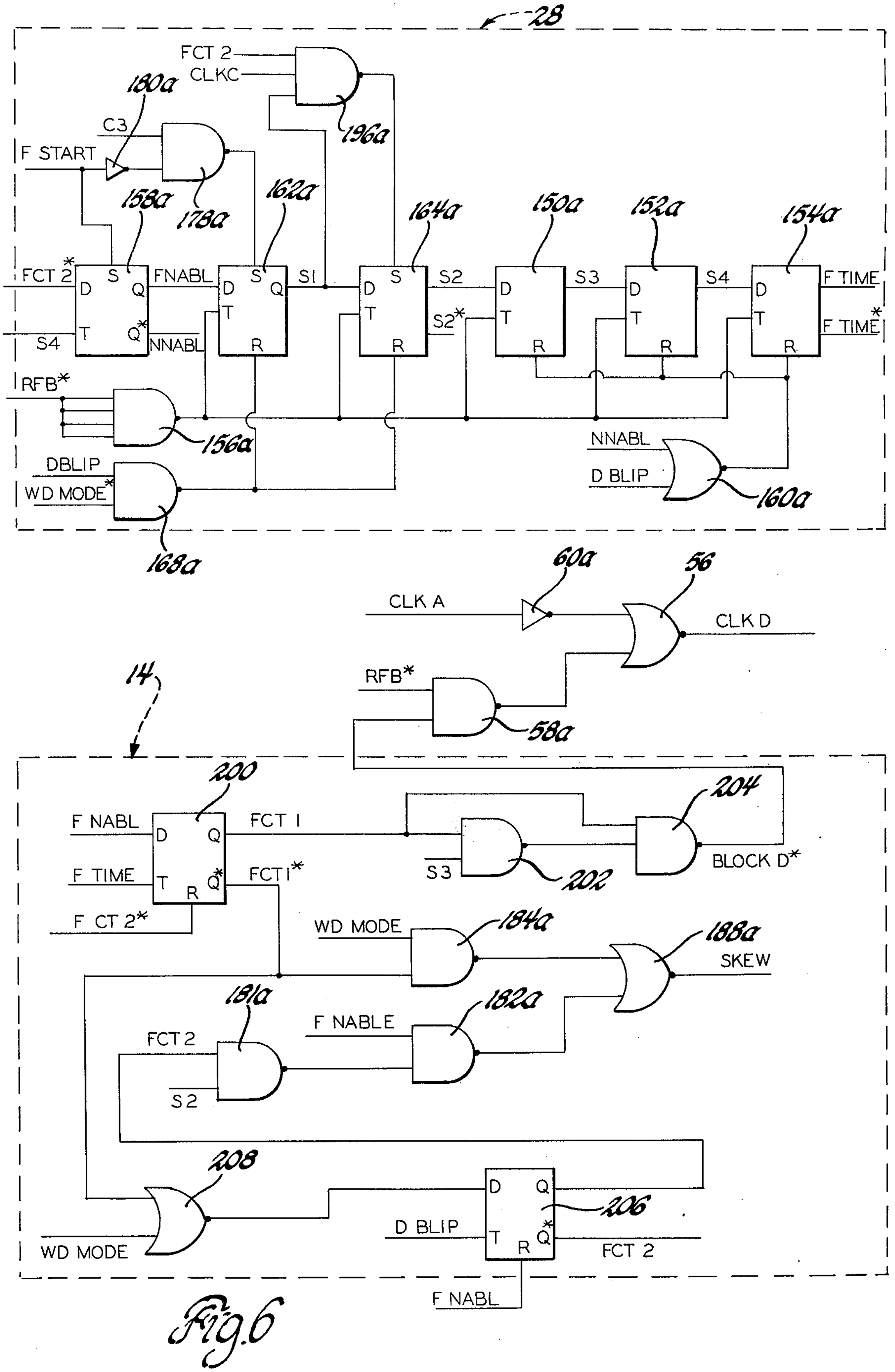
FIG. 6 is a detailed logic diagram of a modification of FIG. 4 for implementing a second embodiment of the invention.

The apparatus for carrying out the 1½T method of encoding is quite similar to that described in FIGS. 1–4. The differences reside primarily in the word mode pulse generator and control logic 28 and the data shift control logic 14 shown in FIG. 4. In implementing the 1½T method the logic shown in FIG. 6 should be substituted for that shown in FIG. 4. Those logic elements in FIG. 4 which are carried over into the FIG. 6 logic are identified by the subscript *a*. The operational modifications resulting from the FIG. 6 logic may be summarized as follows. The first and second transitions of the unique transitional pattern occur as in the FIG. 4 logic. On the second transition a flip-flop 200 is toggled to drive its Q output designated FCT1 high to enable NAND gates 202 and 204. The output of gate 204 is designated BLOCK D* and is driven low for ½ bit cell time by the S3 input to the gate 202 following reset of the flip-flop *150a* from D BLIP through gate *160a*. The inverter 58 of FIG. 2 is replaced by a NAND gate *58a* which receives the BLOCK D* signal. The NOR gate 60 of FIG. 2 is replaced by an inverter *60a*. Accordingly, during word mode coding only one CLKD pulse is provided for each 1½ bit cell time intervals. The generation of the SKEW signal and the control of the 2 or 2½ bit cells trailing boundary is provided by flip-flop 206. The flip-flop 206 has its D input connected with the output of a NOR gate 208 which Ands the signal at the Q* output of the flip-flop 200 with WD MODE. WD MODE goes low just before the last identical word is coded. When the D BLIP associated with the last identical word is produced the flip-flop 206 is toggled to drive its Q output, designated FCT2, high at the beginning or middle of a bit cell. FCT2 is applied as an input to the gate 196a to control flip-flop 164 as in FIG. 4. FCT2* is applied to the reset input of the flip-flop 200 and to the D input of the flip-flop *158a*. FCT1* replaces RDNXTWD* as an input to the gate 52 of FIG. 2.

Having thus described our invention what we claim is:

1. Apparatus for encoding successive identical groups of bits of binary data comprising:

clocking means for forming a plurality of bit cells of uniform time durations and for defining the leading edge and midpoint of each bit cell, and bit pair encoder means responsive to the first of said successive groups of binary data and to said clocking means and comprising parallel in serial out shift register means for storing said groups of bits and gate means for detecting the binary character of adjacent uncoded bits shifted through said register means, said gate means responding to those bits of one binary characterization in said first group of bits by producing first control pulses at the midpoint of only those of the corresponding bit cells which immediately follow a bit cell in which no pulse occurs and which are immediately followed by a bit cell containing a bit of said one binary characterization, said gate means further responding to those of said bits of the other binary characterization in said first group of bits by producing second control pulses at the leading edge of only those of the corresponding bit cells which immediately follow a bit cell in which no pulse occurs and which are immediately followed by a bit cell containing a bit of said other binary characterization, detector means for detecting the number of said successive groups of bits, signal generating means responsive to the number of said successive groups, and to the state of the last bit of said first group of bits by producing third control pulses, said third control pulses consisting of five pulses, the first pulse occurring at the trailing edge of the bit cell corresponding to the last bit of said first group of bits, the second pulse occurring at least two bit cells displaced from said first pulse and occurring at the midpoint or leading edge of a bit cell depending upon whether the state of the last bit of said first group of bits is said one or said other binary characterization respectively, the third pulse displaced from said second pulse by 1½ bit cells, the fourth pulse displaced from said third pulse by 1½ bit cells, and the fifth pulse displaced from said fourth pulse by an amount which exceeds 1½ bit cells by a multiple of ½ bit cells for each group of bits following said first group of bits, output state controller means for providing a bistable output signal containing transitions between separately identifiable states in response to either of said first, second or third control pulses.

2. The apparatus defined in claim 1 wherein said amount that said fifth pulse is displaced from said fourth pulse exceeds 1½ bit cells by ½ bit cell for each group of bits following said first group of bits.

3. Apparatus for reduced redundancy encoding of data comprising:

a source of binary data, clock generator means for forming a plurality of bit cells of uniform time durations, and for defining the leading edge and midpoint of a bit cell, complementary bit pair encoder means responsive to said data and to said clock generator means, said encoder means including first gate means for producing first control pulses occurring at the leading edge of only those bit cells containing a bit of one binary characterization and which immediately follow a bit cell in which no pulse occurs and which are immediately followed by a bit cell containing a bit of said one binary characterization, said encoder means further including second gate means producing second control pulses at the midpoint of only those bit cells containing a bit of the other binary characterization and which immediately follow a bit cell in which no pulse occurs and which are immediately followed by a bit cell containing a bit of said other binary characterization, word comparator means responsive to said data and to said clock generator means for detecting consecutive identical words of data of predetermined bit length, control logic means responsive to said clock generator means and to detection of a predetermined number of consecutive identical words by said word comparator means for inhibiting said complementary bit pair detection means following detection of the complementary bit pairs in the first of the consecutive identical words, pulse generating means responsive to said clock generator means and to said control logic means and said word comparator means for producing third control pulses, said third control pulses consisting of five pulses, the first pulse occurring at the trailing edge of the bit cell corresponding to the last bit in the first of said consecutive identical words, the second pulse occurring at least 2 bit times delayed from said first pulse and at the leading edge or midpoint of a bit cell depending upon whether the state of the last bit of the first of said consecutive identical words is of said one or other binary characterization respectively, the third pulse occurring 1½ bit cells delayed from said second pulse, the fourth pulse occurring 1½ bit cells delayed from said third pulse, and the fifth pulse being delayed from said fourth pulse by an amount which exceeds 1½ bit cells by ½ bit cell for each of the consecutive identical words following the first of said consecutive identical words, said control logic enabling said complementary bit pair detection means at the beginning of a bit cell and at least two bit cells delayed from the said fifth pulse, and output state controller means for providing a bistable output signal containing transitions between separately identifiable states in response to either of said first, second or third control pulses.

4. Apparatus for reduced redundancy encoding of data comprising:

a source of binary data, clock generator means for forming a plurality of bit cells of uniform time durations and for defining the leading edge and midpoint of each bit cell, complementary bit pair encoder means responsive to said data and to said clock generator means, said encoder means including first gate means for producing first control pulses occurring at the leading edge of only those bit cells containing a bit of one binary characterization and which immediately follow a bit cell in which no pulse occurs and which are immediately followed by a bit cell containing a bit of said one binary characterization, said encoder means further including second gate means producing second control pulses at the midpoint of only those bit cells containing a bit of the other binary characterization and which immediately follow a bit cell in which no pulses occur and which are immediately followed by a bit cell containing a bit of said other binary characterization, word comparator means responsive to said data and to said clock generator means for detecting consecutive identical words of data of predetermined bit length, control logic means responsive to said clock generator means and to detection of a predetermined number of consecutive identical words by said word comparator means for inhibiting said complementary bit pair detection means following detection of the complementary bit pairs in the first of the consecutive identical words, pulse generator means responsive to said clock generator means and to said control logic means and said word comparator means for producing third control pulses for identifying the number of consecutive identical words following the first of said consecutive identical words, said third control pulses containing a first pulse which occurs at the trailing edge of the bit cell corresponding to the last bit of the first of the consecutive identical words, a second pulse occurring at least 2 bit times delayed from said first pulse and at the leading edge or midpoint of a bit cell depending upon whether the state of the last bit of the first of said consecutive identical words is of said one or said other binary characterization, additional pulses occurring at 1½ bit time intervals corresponding to the number of consecutive identical words following said first of said consecutive identical words, said control logic means responsive to detection of the last of said consecutive identical words for enabling said complementary bit pair detection means at the beginning of a bit cell and at least two bit cells delayed from the last of said additional pulses, and output state controller means for providing a bistable output signal containing transitions between separately identifiable states in response to either of said first, second or third control pulses.

5. A method of communicating binary information on a communication medium, the medium exhibiting two separately identifiable states and being divided into a plurality of uniform bit cells comprising the steps of:

1. producing a transition between the separately identifiable states at the beginning of the first of two successive bit cells to represent that the two bit cells contain a first two bit data configuration;
2. producing a transition between the separately identifiable states at the midpoint of the first of two successive bit cells to represent that the bit cells contain the complement of said first two bit data configuration;
3. detecting whether a predetermined number of successive groups of bits are identical and if so, communicating the data in the first of said successive groups of bits in accordance with steps 1 and 2 and thereafter inhibiting steps 1 and 2 and producing a transition pattern identifying the number of said successive groups, said transitional pattern consisting of a first transition between the separately identifiable states at the trailing edge of the last bit cell containing the last bit in said first group of bits, a second transition at least two bit cells delayed from said first transition and occurring at the beginning or midpoint of a bit cell depending on the binary characterization of said last bit, third and fourth transitions separated from said second and third transitions respectively by 1½ bit cells, a fifth transition separated from said fourth transition by 1½ bit cells plus ½ bit cell for each of the consecutive identical groups of bits following said first group of bits;
4. repeating steps 1 and 2 after a 2 or 2½ bit cell time delay depending upon whether said fifth transition occurs at the beginning or midpoint of a bit cell respectively.

6. A method of communicating binary information on a communication medium, the medium exhibiting two separately identifiable states and being divided into a plurality of uniform bit cells comprising the steps of:

1. producing a transition between the separately identifiable states at the beginning of the first of two successive bit cells to represent that the two bit cells contain a first two bit data configuration;
2. producing a transition between the separately identifiable states at the midpoint of the first of two successive bit cells to represent that the bit cells contain the complement of said first two bit data configuration;
3. detecting whether a predetermined number of successive groups of bits are identical within a predefined tolerance and if so communicating the data in the first of said successive groups of bits in accordance with steps 1 and 2 and thereafter inhibiting steps 1 and 2 and producing a transitional pattern identifying the number of said successive groups, said transitional pattern consisting of a first transition between the separately identifiable states at the trailing edge of the last bit cell containing the last bit in said first group of bits, a second transition at least two bit cells delayed from said first transition and occurring at the beginning or midpoint of a bit cell depending on the binary characterization of said last bit, additional transitions separated by 1½ bit cells for each of the consecutive identical groups of bits following said first group of bits;
4. repeating steps 1 and 2 after a 2 or 2½ bit cell time delay depending upon whether the last of said additional transitions occur at the beginning or midpoint of a bit cell respectively.

7. Apparatus for reduced redundancy encoding of consecutive identical groups of binary data comprising:

clocking means for forming a plurality of bit cells of uniform time durations and for defining the edge and midpoint of each bit cell, means for detecting the number of consecutive identical groups of said data, means for identifying the binary character of the last bit of the first of the consecutive identical groups of bits, signal generating means responsive to said clocking means and to said detecting means and to said identifying means for generating a bilevel output signal containing a first transition at the trailing edge of the bit cell containing the last bit of said first group of bits, a second transition at least two bit cells displaced from said first transition and occurring at the midpoint or leading edge of a bit cell depending upon whether the state of the last bit of said first group of bits is of one binary character or the other binary character respectively, additional transitions separated by 1½ bit cells and corresponding in number to the number of said groups of bits following said first group of bits.

8. Apparatus for reduced redundancy encoding of consecutive identical groups of binary data comprising:

clocking means for forming a plurality of bit cells of uniform time duration and for defining the edge and midpoint of each bit cell, means for detecting the number of said consecutive groups of said data, means for identifying the binary character of the last bit of the first of the consecutive groups of bits, signal generating means responsive to said clocking means and to said detector means and to said identifying means for generating a bilevel output signal comprising a first transition occurring at the trailing edge of the bit cell containing the last bit of the first of the consecutive identical groups of bits, a second transition occurring at least two bit times delayed from said first transition and at the leading edge or midpoint of a bit cell depending upon whether the state of the last bit of the first of the consecutive identical groups of bits is of one binary character or the other binary character respectively, a third transition occurring 1½ bit cells delayed from said second transition, a fourth transition occurring 1½ bit cells delayed from said third transition, a fifth transition delayed from said fourth transition by an amount which exceeds 1½ bit cells by ½ bit cell for each of the consecutive identical groups of bits following the first of the consecutive identical groups of bits.

* * * * *

UNITED STATES PATENT AND TRADEMARK OFFICE

CERTIFICATE OF CORRECTION

PATENT NO. : 3,914,586
DATED : October 21, 1975
INVENTOR(S) : Duane E. McIntosh

It is certified that error appears in the above-identified patent and that said Letters Patent are hereby corrected as shown below:

Column 1, line 50, "is" should read -- in --.

Column 2, line 4, flag should read -- "flag" --.

Column 2, line 6, flag should read -- "flag" --.

Column 5, line 56, "NCGR $\frac{10 + NBR}{NBCG}$" should read -- NCGR $\geq \frac{10 + NBR}{NBCG}$ --.

Column 6, line 36, add "width in" after the word "in".

Column 7, line 42, "invention" should read -- inversion --.

Signed and Sealed this

*second* Day of *March 1976*

[SEAL]

*Attest:*

RUTH C. MASON
*Attesting Officer*

C. MARSHALL DANN
*Commissioner of Patents and Trademarks*